US012229546B2

(12) United States Patent
Lopez et al.

(10) Patent No.: US 12,229,546 B2
(45) Date of Patent: Feb. 18, 2025

(54) METHOD AND DEVICE FOR UPDATING SOFTWARE OF AN ONBOARD COMPUTER IN A VEHICLE, COMPRISING A RUNTIME MEMORY, A BACKUP MEMORY AND A CONTROL MEMORY

(71) Applicant: PSA AUTOMOBILES SA, Poissy (FR)

(72) Inventors: Thierry Lopez, Conflans Ste Honorine (FR); Francois Rochette, Suresnes (FR); Pierre Schmidt, Cormeilles en Parisis (FR); Emmanuel Georges, Poissy (FR)

(73) Assignee: PSA AUTOMOBILES SA, Poissy (FR)

( * ) Notice: Subject to any disclaimer, the term of this patent is extended or adjusted under 35 U.S.C. 154(b) by 161 days.

(21) Appl. No.: 18/044,744

(22) PCT Filed: Aug. 2, 2021

(86) PCT No.: PCT/FR2021/051434
§ 371 (c)(1),
(2) Date: Mar. 9, 2023

(87) PCT Pub. No.: WO2022/064118
PCT Pub. Date: Mar. 31, 2022

(65) Prior Publication Data
US 2023/0333838 A1    Oct. 19, 2023

(30) Foreign Application Priority Data

Sep. 22, 2020   (FR) ...................................... 2009572

(51) Int. Cl.
*G06F 8/65*     (2018.01)
*G06F 11/14*    (2006.01)

(52) U.S. Cl.
CPC ............ *G06F 8/65* (2013.01); *G06F 11/1451* (2013.01)

(58) Field of Classification Search
CPC ......................................................... G06F 8/65
See application file for complete search history.

(56) References Cited

U.S. PATENT DOCUMENTS 6,108,598 A  *  8/2000  Sumitani ................... G06F 8/65
                                                           701/1
9,632,878 B1 *  4/2017  Maccanti ............ G06F 11/1469
                        (Continued)

FOREIGN PATENT DOCUMENTS

CN      110471680 A      11/2019
WO      2020113186 A1    6/2020

OTHER PUBLICATIONS

International Search Report for corresponding PCT/FR2021/051434 mailed Oct. 29, 2021.
(Continued)

*Primary Examiner* — Jae U Jeon
(74) *Attorney, Agent, or Firm* — Sandberg Phoenix & von Gontard P.C.

(57) ABSTRACT

The invention relates to a method for updating software in a vehicle, comprising an executing memory (ME), a backup memory (MS) and a checking memory (MC), said method involving the steps of:
 issuing a request commanding the writing of at least one updated software block (B', C') into the checking memory (MC);
 issuing a request commanding the verification of the at least one updated software block (B', C') stored in the checking memory (MC);
 issuing a request commanding the copying of the plurality of blocks (A, B, C) from the executing memory (ME) to the backup memory (MS);
(Continued)

issuing a request commanding the copying of the at least one updated software block (B', C') from the checking memory (MC) to the executing memory (ME);

issuing a request commanding the verification of the integrity of the software blocks (A, B', C') in the executing memory (ME).

10 Claims, 5 Drawing Sheets

(56) References Cited

U.S. PATENT DOCUMENTS

| | | | |
|---|---|---|---|
| 2004/0122537 A1* | 6/2004 | Kouda | G06F 8/654 |
| | | | 700/90 |
| 2017/0364305 A1* | 12/2017 | Lee | G06F 13/4243 |
| 2019/0057214 A1 | 2/2019 | Xia et al. | |

OTHER PUBLICATIONS

Written Opinion for corresponding PCT/FR2021/051434 mailed Oct. 29, 2021.

* cited by examiner

[Fig. 1]
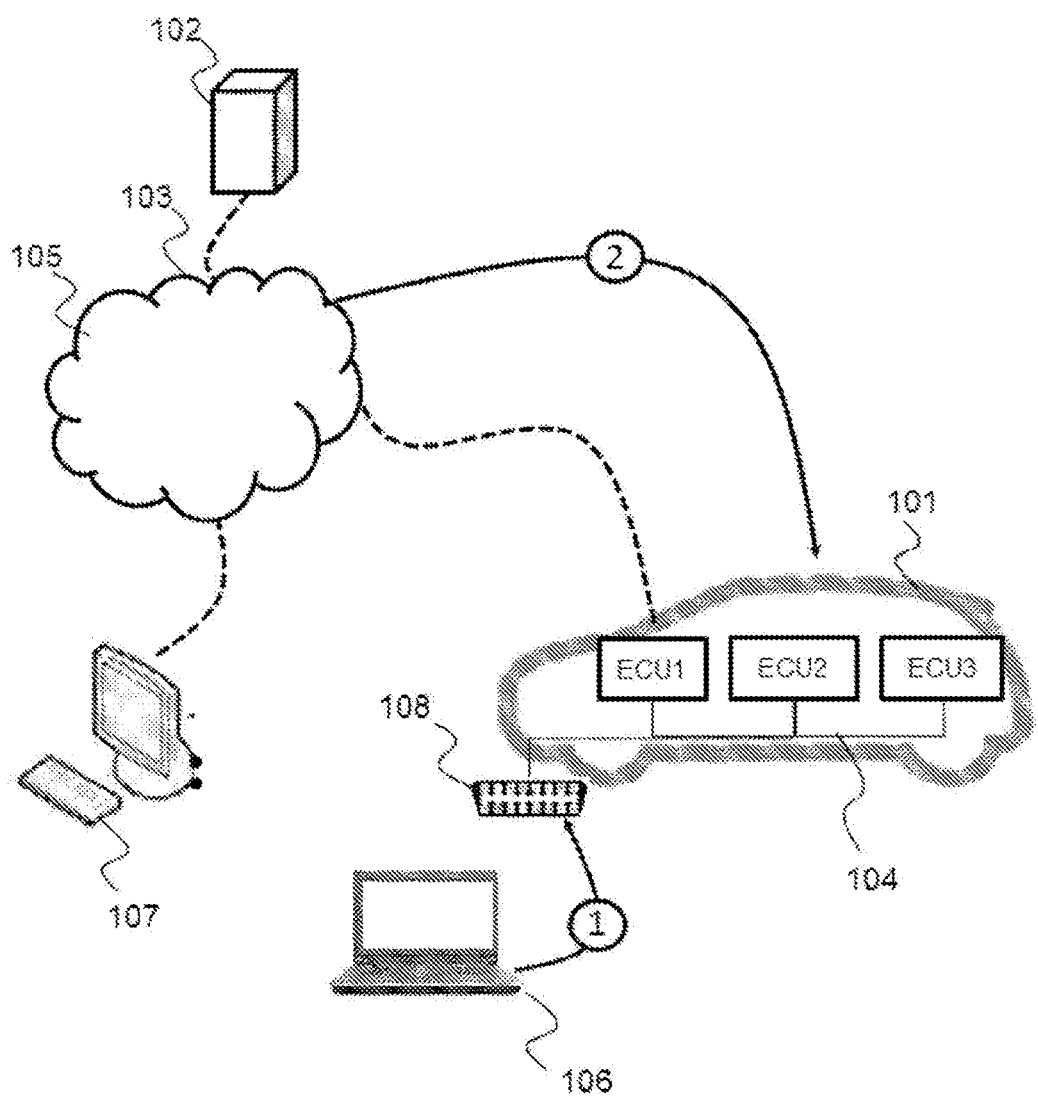

[Fig. 2]
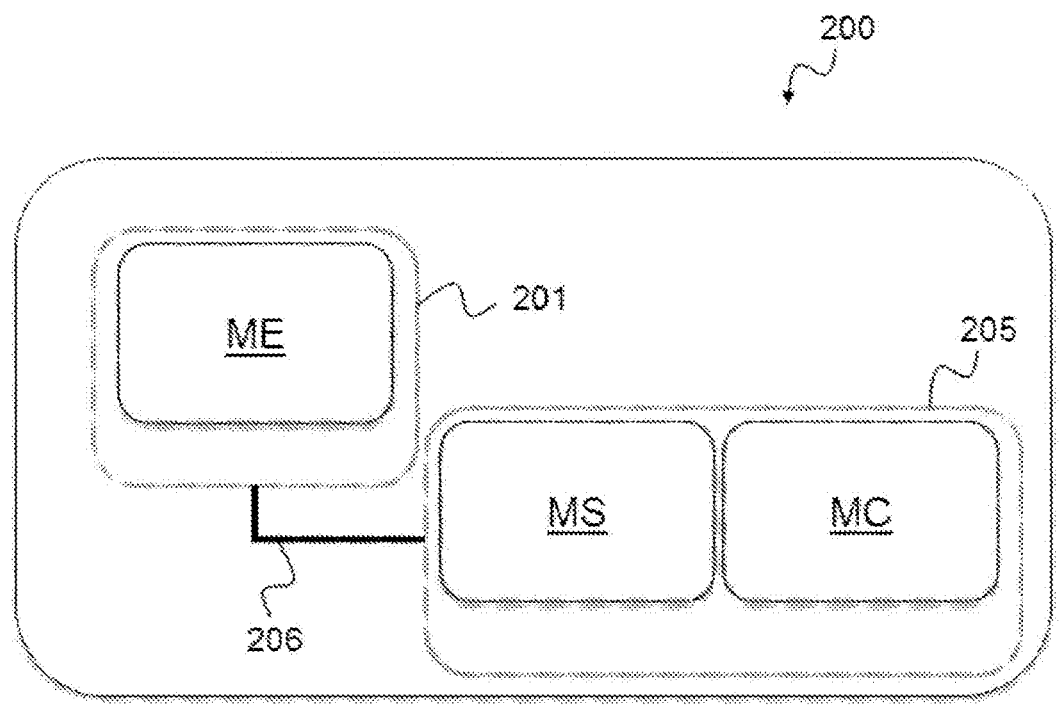

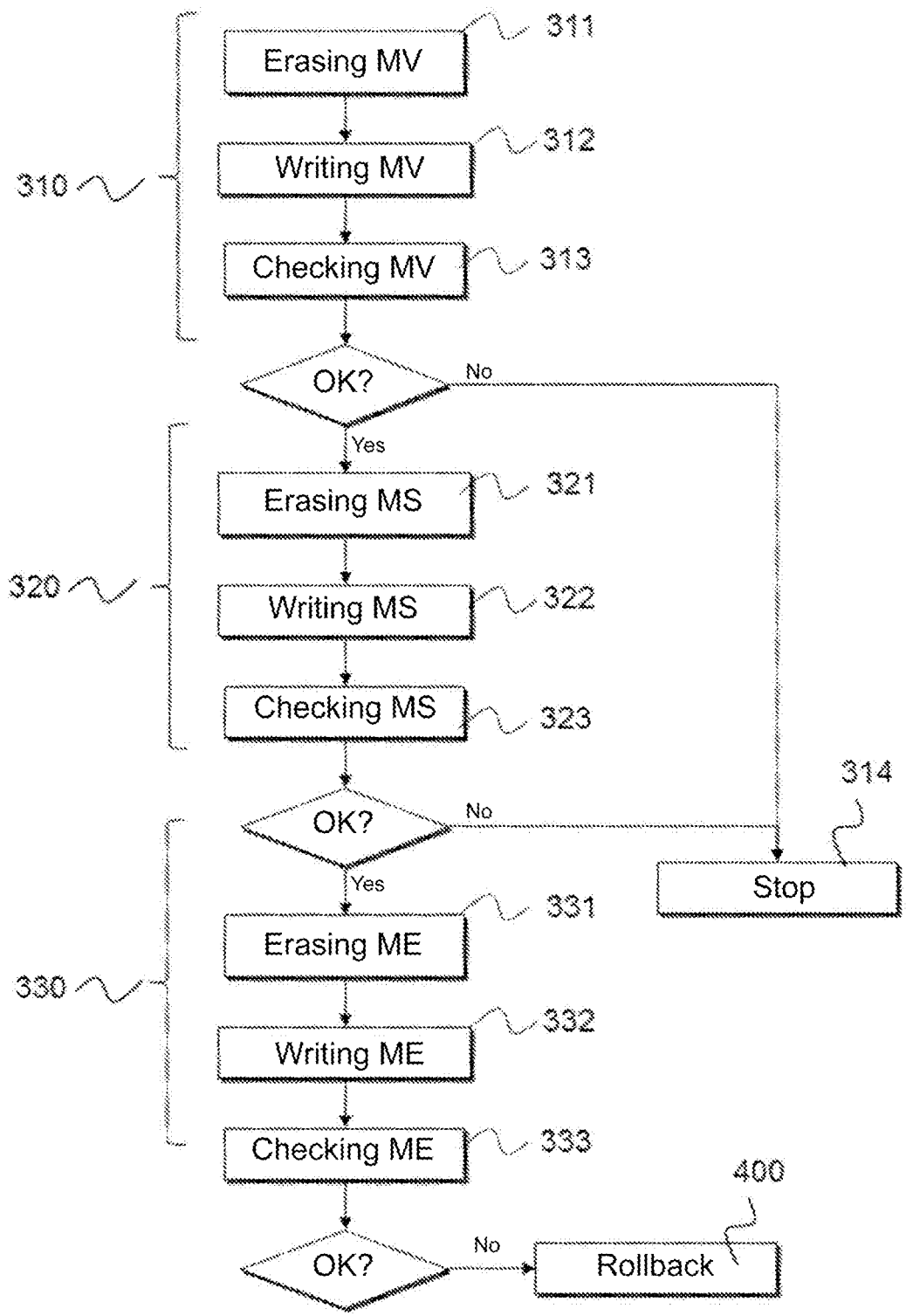
[Fig. 3]

[Fig. 4]
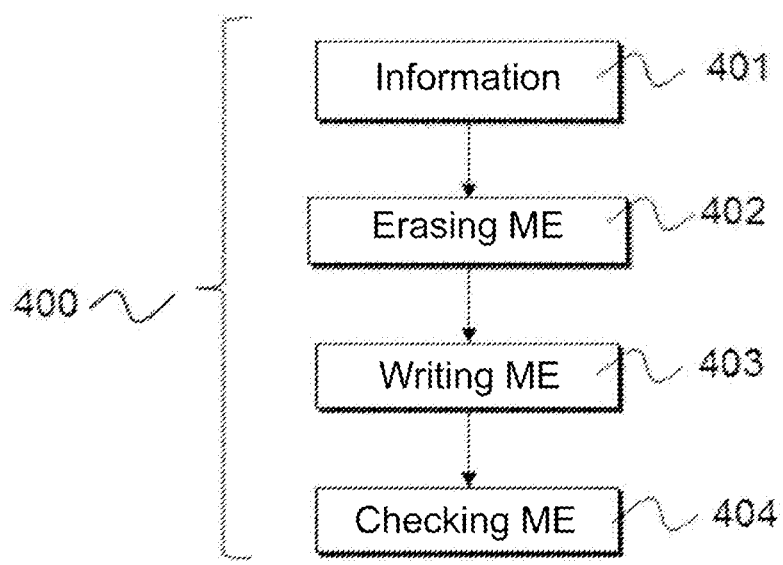

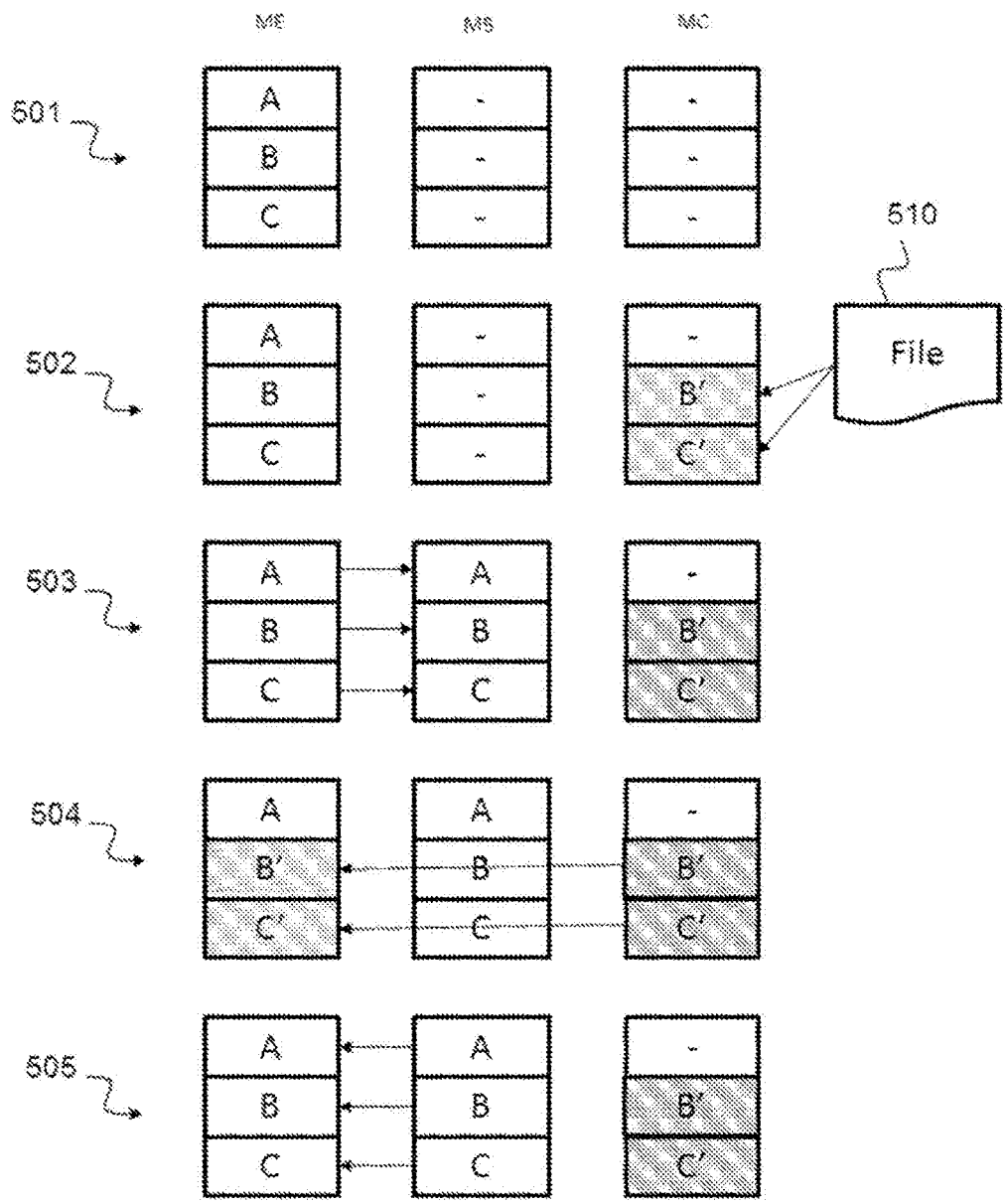
[Fig. 5]

METHOD AND DEVICE FOR UPDATING SOFTWARE OF AN ONBOARD COMPUTER IN A VEHICLE, COMPRISING A RUNTIME MEMORY, A BACKUP MEMORY AND A CONTROL MEMORY

This application is the US National Stage under 35 USC § 371 of International Application No. PCT/FR2021/051434, filed Aug. 2, 2021, which claims the priority of French application 2009572 filed on Sep. 22, 2020, the content (text, drawings and claims) of both said applications being incorporated by reference herein.

TECHNICAL FIELD

The method and device disclosed herein relate to updating software of one or more computers of a motor vehicle carried out remotely from a diagnostic tool, also called OTA (Over The Air) updating.

TECHNOLOGICAL BACKGROUND

In the rest of the description, when the file to be downloaded contains instructions or the executable code of software, reference will also be made to downloading software.

PRIOR ART

The increasing complexity of onboard electronic functions has led to a proliferation of electronic units (or computers) mounted in motor vehicles.

In order to limit the resulting diversity, it has been decided to transfer the hardware diversity onto the software whenever possible and to download it to these computers. The operation is carried out by means of an off-board tool which connects to the diagnostic socket of the vehicle and makes it possible to program into the memory of the computer(s) the software which ensures compliant operation of the vehicle, produced by taking into account the characteristics (engine, options) specific to this vehicle.

Communication between the tool and the computer(s) generally uses either the CAN 500 kbps technology known from the current state of the art or 100 Mbits/s Ethernet technology undergoing deployment in the automotive world in order to transfer the data to be programmed.

Methods and systems for downloading files are already known in onboard computers on motor vehicles, such as those described for example in document FR-A-2719924. This document details the different successive steps of the procedure used during the assembly of the vehicles or in the servicing network of a manufacturer, during the correction of a service by file exchange.

However, in order to keep making vehicles safer for their customers, automakers consider to be able to push certain updates directly to the end customer, similar to what already exists in consumer electronics for a PC or a smartphone, for example. Indeed, the connectivity means present in vehicles already make it possible to exchange numerous pieces of information with the outside world (traffic information, navigation, data for repair or for insurance devices, etc.) and these exchanges are constantly growing. This results in increased demand for the protection of client data, but also for significant protection of these vehicles in view of the possibilities of cyber-attacks and of the risk incurred on road safety. Indeed, upon detection of an attack of this type and the availability of a corrective "patch" (software or software module) able to eliminate or reduce the risks thereof, the speed at which this patch can be installed clearly takes on critical importance. In this case, an OTA update can make it possible to save a lot of time compared to an organized recall of the vehicles in the garage of the approved or independent network.

In order to be able to directly perform this type of operation on the end customer's side, it is nevertheless necessary to take into consideration several aspects which add to the complexity of this operation.

The updating of the software of an automobile computer can in some cases make it unavailable or else induce significant consequences both for the occupants of the vehicle and for its environment. This is the reason why the OTA update of certain computers and in particular those which are associated with the dynamics of the vehicle require a mechanism called a rollback which makes it possible to return to the prior software configuration in the case of the detection of a problem occurring during the updating of the software of one or more computers of the vehicle.

This type of problem may for example occur in the case where the receiving computer attempts to write a value to a corrupted memory cell for example, or in the case of a transmission error due for example to an electromagnetic field, or even other cases.

Such a type of problem is generally detected by the receiving computer (for example by means of a Cyclic Redundancy Check, or CRC, in the case of an erroneous reception). In this case, information will be transmitted to the master computer in order to request the execution of the rollback process.

For example, document US20190057214 discloses an update control device comprising a first communication circuit, a second communication circuit, and a processor. The first communication circuit is configured to receive patch data for each block of the software and first authentication data for each block for authenticating software in a terminal updated using the patch data on a per-block basis.

The processor is configured to request the terminal to perform a rollback to restore a first block to an (M−1)th block using the patch data, upon receipt of an update result indicating a failure in authenticating an Mth block (M>1).

Despite all these precautions and these verification systems, it remains possible that certain cases of poor operation cannot be detected at the end of the OTA update.

SUMMARY

One purpose of the herein disclosed method is to propose a solution for rapidly returning a computer of a vehicle to a state prior to a software update, in particular when an update file is corrupted.

The method disclosed herein relates in particular to updating software of an onboard computer of a vehicle, comprising an executing memory (ME) wherein a plurality of blocks (A, B, C) of a current software are stored, a backup memory (MS), and a checking memory (MC), characterized in that it comprises the steps of:
  issuing (312) a request commanding the writing of at least one updated software block (B', C') into the checking memory (MC),
  issuing (313) a request commanding the verification of the said at least one updated software block (B', C') stored in the checking memory (MC), issuing (322) a request commanding the copying of the plurality of blocks (A, B, C) of the current software from the executing memory (ME) to the backup memory (MS), issuing (332) a request commanding the copying (332) of said at least one updated software block (B', C') from the checking memory (MC) to the executing memory (ME), issuing (333) a request commanding a verification of the integrity of the software blocks (A, B', C') in the executing memory (ME), And if an error is detected, then:

issuing (400) a request commanding a return to state prior to the update comprising copying (403) the plurality of blocks of the current software (A, B, C) from the backup memory (MS) to the executing memory (ME), said method being further characterized in that it comprises a step of issuing a request to open the programming session on the onboard computer, subsequent to the step of issuing (313) a request commanding the verification of the said at least one updated software block (B', C') stored in the checking memory (MC), prior to the step of issuing (332) a request commanding the copying (332) of said at least one updated software block (B', C') from the checking memory (MC) to the executing memory (ME).

The disclosed method has the advantage that when a test of the integrity of the received data leads to a failure, the installation procedure can be interrupted without delay and the initial software can be immediately restarted, as the executing memory has not yet been modified.

The disclosed method therefore saves time but also enhances security, insofar as it eliminates additional risks of corruption of the data inevitably linked to the successive operations of generating current software blocks in the solutions of the prior art.

By using an additional verification memory, the probability of having to execute a rollback is lower than with the other solutions known from the prior art. This considerably reduces the risk of failure during the execution of the return to configuration n−1 of the vehicle.

Furthermore, by opening the programming session of the computer after the verification of the updated software block stored in the checking memory and preferentially the copying of the executing memory into the backup memory, the disclosed method has the advantage of being able to transfer the computer update to the target computer and preferentially copy the executing memory into the backup memory while the vehicle is in its functional state. Thus, the vehicle need only be stopped after this phase. Please keep in mind that when the vehicle (in particular a combustion vehicle) is running, the energy necessary for the update operations can come from an alternator. But when the vehicle is stopped, this energy comes only from the vehicle battery. It is understood that this aspect may prove to be limiting depending on the number of computers to be reprogrammed during the operation (a hybrid drivetrain can implement seven different computers in consistency with the updating of software versions), the volume of data concerned (size of the executable software) to be copied, and also the type of internal network used to perform this operation.

Each of these criteria can make the OTA update operation applicable or not depending on the reserve of energy contained in the battery, knowing that the energy required to restart the vehicle must always be placed at the end of the process.

The disclosed method therefore makes it possible to reduce the amount of energy required in the battery to perform an update operation, by carrying out as many updating steps as possible while the computer is functional.

Advantageously, the method for updating software of a computer according to the present disclosure further comprises a step of issuing a request commanding said computer to erase the checking memory, prior to issuing the request commanding the writing to the checking memory of at least one updated software block.

Advantageously, the method for updating software of a computer according to the present disclosure further comprises a step of issuing a request commanding said computer to erase the backup memory, prior to the issuing of the request commanding the copying of the plurality of blocks of the current software from the executing memory to the backup memory.

Advantageously, the method for updating software of a computer according to the present disclosure further comprises a step of issuing a request commanding said computer to check the integrity of the plurality of blocks of the current software in the backup memory.

Advantageously, the method for updating software of a computer according to the present disclosure further comprises a step of issuing a request commanding said computer to erase the software blocks to be updated from the executing memory.

Advantageously, the step of returning to a state prior to the update further comprises a prior step of deleting the executing memory from the computer and a step of checking the integrity of the plurality of blocks of the current software in the executing memory.

Advantageously, the step of returning to a state prior to the update further comprises a step of stopping the update, comprising a command to return to a state prior to the update to other computers affected by said update.

According to a first variant of the disclosed method, the step of issuing the request to open a programming session on the onboard computer is carried out at the end of the step of issuing a request commanding said computer to erase the checking memory.

According to a second variant of the disclosed method, the step of issuing the request to open a programming session on the onboard computer is carried out right after the step of issuing a request commanding said computer to check the integrity of the plurality of blocks of the current software in the backup memory.

The present disclosure also relates to a device for updating software of a computer, said device comprising a memory associated with at least one processor configured to implement the steps of the method according to the present disclosure.

The present disclosure also relates to a vehicle characterized in that it comprises a device for updating software of a computer according to the present disclosure.

BRIEF DESCRIPTION OF THE FIGURES

Other features and advantages of the disclosed method and device will become apparent from the description of the non-limiting embodiments of the disclosed method and device, with reference to the appended figures, in which:

FIG. 1 schematically shows a system, according to one particular embodiment of the present disclosure.

FIG. 2 schematically shows a computer, according to one particular embodiment of the present disclosure.

FIG. 3 schematically shows an updating method, according to one particular embodiment of the present disclosure.

FIG. 4 schematically shows sub-steps of a step of returning to a state prior to an update, according to one particular embodiment of the present disclosure.

FIG. 5 shows an example of the successive states of memories of a computer during an update.

DETAILED DESCRIPTION

The object of the present disclosure is in particular a method for updating, via a wired communication or a wireless communication, an onboard computer equipped with an external memory whose capacity is double that of the executing memory. In the event of failure during the software update operation, the procedure provides a rollback operation that returns to version n−1 so that the vehicle can resume functionality.

With reference to FIG. 1, the system according to the disclosed method comprises a vehicle 101 connected to a remote update server 102.

The vehicle 101 comprises a plurality of computers ECU1, ECU2, ECU3, including an on-board communication unit that communicates with the server 102, via a wireless connection. Typically, the wireless connection or link is a radio wave connection (3G, 4G, etc.).

The computers ECU1, ECU2, ECU3 communicate with each other via a data bus 104 (for example of the CAN type).

The remote server 102 is for example a generic computer comprising at least one memory and a processor.

The vehicle 101 and the remote server 102 communicate via an extended network 105 such as a fixed communication network 103 (or WAN for "Wide Area Network"), for example the Internet, to which the vehicle connects via a wireless link (3G, 4G, etc.).

The computer ECU1, also called an update management computer (or FOTA Master—for Firmware Over-The-Air), which allows the updating of the computers ECU2 to ECU3, has for this purpose mechanisms capable of transferring the data files received into frames expected by the receiving computers ECU2, ECU3 for installing their software. It should be noted that the computer acting as FOTA master in a vehicle may or may not be the same computer as that which has wireless communication functions.

An operator via a terminal 107 can perform the verifications and transmits remote instructions to the vehicle 101. These instructions are transmitted to the vehicle 101 by a wave route which may be 4G, WIFI, or any other future wireless communication technology.

The computers ECU1, ECU2, ECU3 can be updated in a garage. The updating of software in a garage fulfills a specific procedure (case 1 of FIG. 1) during which the operator becomes responsible for the vehicle with which they have been entrusted. For this purpose, they place the vehicle in a "safe and secure" environment before launching this operation from a tool 106 plugged into a dedicated socket 108 of the vehicle 101. Next, once the operation has ended, they perform certain controls in order to ensure that it is in good working order. In the event of a detected problem, either during the execution of the procedure or after the update, the technician will take the measures necessary to correct the anomaly (new test, changing a part, etc.) before returning the vehicle to the client. Therefore, the garage is not only an important link of the safety chain, but also responsible for ensuring the quality of the operation performed.

During an OTA update on a client's side (case 2 of FIG. 1), none of this is possible, and it is therefore appropriate to add a mechanism in each computer that makes it possible to return to the previous version if there is a problem.

To perform the operations described in this patent proposal, the FOTA master communicates with the target computer via the communication network available in the vehicle (for example CAN, Ethernet or other). For this purpose, it uses a dedicated communication protocol, such as, for example, the UDS protocol (standard ISO14229) commonly used to carry out the diagnosing or downloading of the computer software on board motor vehicles.

With reference to FIG. 2, the computer 200 according to the disclosed method comprises:
 a microcontroller 201 comprising a Flash memory ME, of a given size N, used to run the downloaded software and called the executing memory ME,
 a backup memory MS, of a size at least equal to the given size N, used as a backup memory making it possible to return to the previous version of the software in the event of a problem during installation,
 a checking memory MC, of a size at least equal to the given size N, used to check the integrity of the new software received by a wired or OTA method even before initiating any modification of the content of the execution memory.

According to a first variant of the disclosed method, the backup memory MS and the checking memory MC belong to an external Flash memory 205, with a size at least equal to twice the given size N.

The external Flash memory is linked to the microcontroller, for example by a SPI (Serial Peripheral Interface) bus 206, but it could be another kind of data link.

This bus can be replaced by any other communication bus technology, the data exchange rate of which is sufficient for the installation of the new software to be carried out within a reasonable period of time as seen by the client. Advantageously, the data exchanged between the internal memory and the external memory are encrypted, so as to improve the security of the update.

According to a second variant of the disclosed method, the backup memory MS and the checking memory MC can be integrated into the memory of the microcontroller 201. This variant has the advantage of not having to encrypt the data when copying from one memory to another. Furthermore, this variant makes it possible to dispense with additional components used to manage the communication with an external memory. In contrast, this variant involves using a microcontroller having an internal memory whose size is at least triple that of the maximum size of the software.

The method according to the present disclosure will now be presented with reference to FIG. 3, showing steps of said method and FIG. 5, showing an example implementation of said method.

In the example of FIG. 5, the computer to be updated 200, or target computer, has software in its executing memory ME. This software is composed of 3 data blocks A, B and C.

The method according to the present disclosure comprises:

A first phase 310 during which: the update data (blocks B' and C' in the example) contained in the file to be downloaded are transmitted to the target computer 200 (via wired communication or wireless communication) and are placed in the checking memory MC in order to check their integrity. This makes it possible to not alter the software currently in the executing memory ME.

A second phase 320 during which: the totality of the content of the executing memory ME is duplicated in the backup memory MS in order to keep a copy of the original software.

A third phase 330 during which: the data blocks contained in the checking memory MC, blocks B' and C' in the example, are copied into the executing memory ME in order to replace the blocks of the old software (blocks B and C in the example). The data blocks not affected by the update are not modified (block A in the example).

A fourth phase, called the rollback phase, executed in the event of failure of the installation during which the totality of the content of the backup memory MS is copied into the executing memory ME in order to return to the initial software.

During the updating of the target computer, the FOTA master places the computer 200 in a state dedicated to programming (where the functionality is deactivated) by using a reprogramming request in the session. The target computer 200 agrees to execute this request only if the safety conditions are met (e.g., vehicle stopped, drivetrain disabled, etc.)

In the reprogramming session, the FOTA master communicates directly with the boot software of the target computer 200. Depending on the queries sent by the FOTA master, the boot software of the computer can execute different operations (writing, copying, integrity check) on one of the three memories it has (executing memory ME, backup memory MS, or checking memory MC). The moment when the request to launch a reprogramming session is sent to the target computer is detailed below in the description.

FIG. 3 describes a succession of actions to be performed by the FOTA master to install new software in the target computer 200.

Before running the updating method according to the present disclosure, the target computer 200 is in a first state 501, called the initial state, wherein: the executing memory ME comprises three blocks of a current software.

Advantageously, the first phase 310 comprises the following steps:

In a first step 311, the FOTA master sends a request to request the target computer to erase the checking memory MC.

In a second step 312, the FOTA master writes the data received from the remote server (by wired or wireless communication) into the checking memory MC of the target computer 200 using dedicated requests. This operation is repeated for each data block to be updated.

In the embodiment whereby the checking memory MC is in an external memory 205, it is the boot software of the target computer which transparently manages, on behalf of the FOTA master, the exchanges made on the communication bus 206 (for example of the SPI type) between the microcontroller 201 and its external memory 205.

In a third step 313, the FOTA master sends a request to ask the target computer 200 to check the integrity of the data copied in the checking memory MS. This verification can be carried out using a Cyclic Redundancy Check CRC or any other method known from the prior art (example: calculation, using a hashing function, of a "condensate" of the content of the data downloaded into the target computer, and comparing the result with a reference value transmitted beforehand by the FOTA master). If the memory is composed of several data blocks, each block has its own integrity check mechanism (based on the same method or different methods).

In the event of failure during one of the first 311, second 312 or third 313 steps, the FOTA master receives a negative response from the target computer 200. In this case, the FOTA master abandons the normal running of the installation procedure to perform a procedure for stopping the installation 314.

Following the first phase 310, the target computer 200 is in a second state 502 wherein: the executing memory ME comprises three blocks of a current software A, B, C, and the checking memory MC comprises the updated software blocks B', C'; coming from the update file 510.

Advantageously, the second phase 320 comprises the following steps.

In a fourth step 321, the FOTA master sends a request to ask the computer 200 to erase the backup memory MS.

In a fifth step 322, the FOTA master sends a request to ask the target computer 200 to copy the totality of the content of the executing memory ME into the backup memory MS.

In a sixth step 323, the FOTA master sends a request to ask the target computer 200 to check the integrity of the data copied into the backup memory MS. This verification is advantageously carried out by the same methods as in the third step 313.

In the event of failure during one of the fourth 321, fifth 322 or sixth 323 steps, the target computer 200 returns a negative response to the FOTA master. The FOTA master then runs the procedure for stopping the installation 314.

Following the second phase 320, the target computer 200 is in a third state 503 wherein: the executing memory ME comprises the three blocks of the current software A, B, C, the checking memory MC comprises the updated software blocks B', C' coming from the update file 510, and the backup memory MS comprises the three blocks of the current software A, B, C.

According disclosed method, the third phase 330 is executed only if the first phase 310 and the second phase 320 were successfully completed. From this phase, the boot software of the target computer 200 invalidates the application software present in the executing memory ME because it is likely to be modified by the rest of the operations. For this, it can for example store a variable (or flag) in non-volatile memory, which will be tested at each initialization of the computer 200 in order to verify whether the application software loaded in the executing memory ME can be executed or not.

Advantageously, the third phase 330 comprises the following steps.

In a seventh step 331, the FOTA master sends as many requests as necessary to request the target computer 200 to erase all the data blocks to be updated in the executing memory ME. The list of data blocks to be updated is provided to the FOTA master via the download file.

In an eighth step 332, the FOTA master sends as many requests as necessary to request the target computer 200 to copy each data block to be updated from the checking memory MC to the executing memory ME.

In a ninth step 333, the FOTA master sends as many requests as necessary to ask the target computer to check the integrity of the data of each updated data block in the executing memory ME. This verification is advantageously carried out by the same methods as in the third step 313.

Following the third phase 330, the target computer is in a fourth state 504 wherein: the executing memory ME comprises one block of the current software A, and two blocks of the updated software B', C'; the checking memory MC comprises the updated software blocks B', C' coming from the update file 510; and the backup memory MS comprises the three blocks of the current software A, B, C.

In the event of failure during one of the seventh 331, eighth 332 or ninth 333 steps, the target computer 200 returns a negative response to the FOTA master. The FOTA master then executes the operation of returning to a state prior to the update (rollback).

If the third phase 333 is executed correctly, then the boot software of the computer declares the application software valid (and therefore modifies the corresponding variable). The newly downloaded software will therefore automatically be executed by the computer 200 during its next reset caused either by a request from the FOTA master, or by an outage and then return of the power supply.

The procedure for stopping the installation 314 is executed only in the event of failure of the installation before the third phase 330.

Two cases are to be distinguished depending on the type of intervention initially provided by the operator: (case 1) only the target computer is updated or (case 2) a plurality of computers are affected by the update.

The FOTA master determines whether a plurality of computers are affected by the update.

If a single computer is affected by the update, the FOTA master sends a message to propose to the operator either restarting, or abandoning the installation. In the event of abandonment, as the content of the executing memory ME has not yet been modified at this stage of the operations, the computer 200 is operational as soon as the next reset, without a rollback operation.

If a plurality of computers are affected by the update, in particular when consistency must be provided between the software versions of the various computers of the vehicle:
  if at the time of the error, only the target computer 200 has started its update, the FOTA master proceeds as for the first case (sending a message to the operator and no rollback if abandoned),
  if at the time of error, other computers in the vehicle have already been updated, the FOTA master triggers the rollback process in all the computers of the vehicle that require it until a state preceding the update in the other computers of the vehicle is restored.

As previously indicated, in case of failure during one of the seventh 331, eighth 332 or ninth 333 step, the FOTA master then executes the operation of returning to a state prior to the update (rollback).

Referring to FIG. 4, the rollback step 400 comprises the following sub-steps.

Advantageously, the FOTA master transmits 401 a message to the HMI to inform the operator that a rollback operation is ongoing on one or more computers of the vehicle.

The FOTA master sends 402 a request to ask the target computer 200 to erase the entire executing memory ME.

The FOTA master sends 403 a request to ask the target computer 200 to copy all of the content of the backup memory MS into the executing memory ME.

The FOTA master sends 404 a request to ask the target computer to check the integrity of the data copied in the executing memory ME. This verification is advantageously carried out by the same methods as in the third step 313.

Following the rollback operation, the computer can again operate with its initial software after its reset caused either by a request from the FOTA master, or by an outage and then restoration of the power supply.

Following the rollback operation 400, the target computer is in a fifth state 505 wherein: the executing memory ME comprises the three blocks of the current software A, B, C, the checking memory MC comprises the updated software blocks B', C' coming from the update file 510, and the backup memory MS comprises the three blocks of the current software A, B, C.

According to the disclosed method, the step of issuing (not shown in the figures) a request to open the programming session on the onboard computer, is sent:
  subsequent to the step of issuing (313) a request commanding the verification of the said at least one updated software block (B', C') stored in the checking memory (MC),
  prior to the step of issuing (332) a request commanding the copying (332) of said at least one updated software block (B', C') from the checking memory (MC) to the executing memory (ME).

Thus, with the disclosed method, at least the first phase of the method is carried out while the target computer is functional (the order to open the reprogramming session has not yet been sent).

On the other hand, when the content of the executing memory ME must be modified, the computer must have an open re-programming session.

According to a first variant of the disclosed method, the step of issuing the request to open a programming session on the onboard computer is carried out at the end of the step of issuing (311) a request commanding said computer to erase the checking memory (MC). This variant is well suited to an implementation on a target computer comprising low computing resources, for example a single-core computer.

According to a second variant of the disclosed method, the step of issuing the request to open a programming session on the onboard computer is carried out right after the step of issuing (323) a request commanding said computer to check the integrity of the plurality of blocks of the current software (A, B, C) in the backup memory (MS). This variant is well suited to an implementation on a target computer comprising greater computing resources, for example a multi-core computer. This variant makes it possible to further delay (if the resources of the target computer allow it) the moment when the target computer enters a non-functional state.

Please keep in mind that a programming session is a state of the computer wherein the computer is non-functional and wherein the executing memory is write-accessible to edit software blocks. On the contrary, in a common state, the computer is functional and the executing memory is not write-accessible to edit software blocks.

The invention claimed is:

1. A method for updating software of an onboard computer of a vehicle, comprising an executing memory wherein a plurality of blocks of a current software are stored, a backup memory, and a checking memory, characterized in that it comprises steps of:
  issuing a request commanding writing of at least one updated software block into the checking memory,
  issuing a request commanding verification of the said at least one updated software block stored in the checking memory,
  issuing a request commanding copying of the plurality of blocks of the current software from the executing memory to the backup memory,
  issuing a request commanding the copying of said at least one updated software block from the checking memory to the executing memory,
  issuing a request commanding a verification of integrity of the software blocks in the executing memory, and if an error is detected, then:
  issuing a request commanding a return to state prior to the update comprising copying the plurality of blocks of the current software from the backup memory to the executing memory,
said method being further characterized in that it comprises a step of issuing a request to open programming session on the onboard computer, subsequent to the step of issuing a request commanding the verification of the said at least one updated software block stored in the checking memory, and prior to the step of issuing a request commanding the copying of said at least one updated software block from the checking memory to the executing memory.

2. The method for updating software of a computer according to claim 1, further comprising a step of issuing a request commanding said computer to erase the checking memory, prior to issuing the request commanding the writing to the checking memory of at least one updated software block.

3. The method for updating software of a computer according to claim 2, wherein the step of issuing the request to open the programming session on the onboard computer is carried out right after the step of sending a request commanding said computer to erase the checking memory.

4. The method for updating software of a computer according to claim 1, further comprising a step of issuing a request commanding said computer to erase the backup memory, prior to the issuing of the request commanding the copying of the plurality of blocks of the current software from the executing memory to the backup memory.

5. The method for updating software of a computer according to claim 1, further comprising a step of issuing a request commanding said computer to check the integrity of the plurality of blocks of the current software in the backup memory.

6. The method for updating software of a computer according to claim 1, wherein the step of issuing the request to open the programming session on the onboard computer is carried out right after the step of sending a request commanding said computer to check the integrity of the plurality of blocks of the current software in the backup memory.

7. The method for updating software of a computer according to claim 1, further comprising a step of issuing a request commanding said computer to erase the software blocks to be updated from the executing memory.

8. The method for updating software of a computer according to claim 1, wherein the step of returning to a state prior to the update further comprises a prior step of erasing the executing memory from the computer and a step of checking the integrity of the plurality of blocks of the current software in the executing memory.

9. A device for updating software of a computer, said device comprising a memory associated with at least one processor configured to implement the steps of the method according to claim 1.

10. A vehicle characterized in that it comprises a device for updating software of a computer according to claim 9.

* * * * *